United States Patent
Barak et al.

[11] Patent Number: 6,157,551
[45] Date of Patent: Dec. 5, 2000

[54] ELECTRONIC TRANSFORMER FOR LIGHTING

[75] Inventors: Shaul Barak, Ramat Gan; Victor Doroshev, Ramla, both of Israel

[73] Assignee: Lightech Electronics Industries Ltd., Rishon Lezion, Israel

[21] Appl. No.: 09/436,628

[22] Filed: Nov. 9, 1999

[30] Foreign Application Priority Data

Nov. 9, 1998 [IL] Israel ........................................ 126967

[51] Int. Cl.⁷ .................................................. H02M 5/458
[52] U.S. Cl. .................................................. 363/37; 363/56
[58] Field of Search ............................. 363/34, 370, 55, 363/56

[56] References Cited

U.S. PATENT DOCUMENTS

| | | | |
|---|---|---|---|
| 4,553,070 | 11/1985 | Sairanen et al. | 363/37 |
| 4,862,041 | 8/1989 | Hirschmann | 315/246 |
| 5,103,139 | 4/1992 | Nilssen | 315/219 |
| 5,563,777 | 10/1996 | Miki et al. | 363/37 |
| 5,740,021 | 4/1998 | Lecheler et al. | 363/37 |
| 5,828,188 | 10/1998 | Lecheler | 315/309 |

FOREIGN PATENT DOCUMENTS

| | | | |
|---|---|---|---|
| 0 264 765 | 4/1988 | European Pat. Off. | H05B 41/24 |
| 0 331 157 | 9/1989 | European Pat. Off. | H02M 3/335 |
| 0 466 031 | 1/1992 | European Pat. Off. | H05B 39/04 |
| 0 800 334 | 10/1997 | European Pat. Off. | H05B 39/04 |
| 44 18 886 | 12/1995 | Germany | H02M 5/458 |
| 195 00 615 | 7/1996 | Germany | H05B 39/04 |

*Primary Examiner*—Jeffrey Sterrett
*Attorney, Agent, or Firm*—Browdy and Neimark

[57] ABSTRACT

An electronic transformer for lighting includes a rectifier coupled to an inverter an output transformer (T1, T10) and a drive transformer (T2, T11). A protection mechanism (VR1, VR2) is responsively coupled to a winding of the output transformer and to a winding of the drive transformer such that the voltage across each of the windings are approximately equal and opposite during normal operation but differ substantially during a short-circuit.

13 Claims, 7 Drawing Sheets

ELECTRONIC TRANSFORMER FOR LIGHTING

FIELD OF THE INVENTION

This invention relates to electronic transformers for lighting, particularly halogen lighting.

BACKGROUND OF THE INVENTION

Owing to the popularity of 12V halogen lamps, there is need for effective power supplies to convert mains voltage of 120V or 230V to 12V. One popular arrangement is the so-called "electronic transformer" in which the 50 Hz or 60 Hz utility current is rectified (giving 100 Hz or 120 Hz, respectively) and then inverted (i.e. chopped) using a half or full bridge topology to give a square wave with fundamental frequency typically in the range of at least 20 kHz.

Such systems have in the past suffered from a number of disadvantages. In the first instance, the necessity to protect the device against short circuits on the output, where implemented, involves passing the current in the system through a resistor such that when the current in the system exceeds a certain preset value the voltage across the resistor is of a value to switch on a transistor which in some way disables the system. However, in a 50 W system, for example, typically as much as 1 W is dissipated through the resistor causing unnecessary heating of the system. Such heating causes further inefficiencies as many components are less efficient when warm.

A second problem is that efficient use of the devices depends on an environment which conducts heat away from the electronic transformer in an effective manner. However, users of the transformer may be unaware of this requirement and may place the transformer within an enclosure containing trapped air or insulating materials or in a place where it may occasionally encounter high ambient temperatures. The known solution of using a temperature-sensing device to disable the electronic transformer at a certain preset temperature is often unacceptable as the transformer is required to work even when ambient temperatures are for some reason high.

A third problem relates to the use of electronic transformers where a lead-edge dimmer (e.g. an SCR, also called an incandescent dimmer owing to its popularity for use with line voltage incandescent lamps) is connected to the input. The dimmer reduces the power in the system by disconnecting the input for some proportion of the 50 Hz or 60 Hz half-cycle following the zero crossing (see FIG. 4c for a schematic of the input voltage to the electronic transformer when such a dimmer is in use). Each time the dimmer triggers, the input voltage jumps from zero to a substantial voltage and it is necessary for the inverter to be triggered in to oscillations very quickly in order to avoid the SCR device switching off (as will occur if there is no hold-up current for more than a few hundred microseconds). However, as the input voltage prior to dimmer triggering is zero, the capacitor providing energy for the inverter's triggering device is uncharged when the dimmer triggers and must take some time to charge before the inverter can trigger, during which time the SCR may switch off. This means that many electronic transformers cannot work when lead-edge dimmers are connected to the input.

A fourth problem relates to the use of electronic transformers, particularly of high power ratings (e.g. 300 W) where a dimmer is connected on the input even when the above problem is overcome, owing to the need also to design the transformer with radio frequency interference filters. This necessitates the use of a large capacitor after the input rectification of the system (before the inverter) where the frequency is 100 Hz or 120 Hz. However, when a dimmer is used, the sudden surge of current each time the dimmer triggers causes unacceptable acoustic sound in the capacitor (which, at 100 or 120 Hz is audible) and which may also damage the capacitor.

Figure 4:
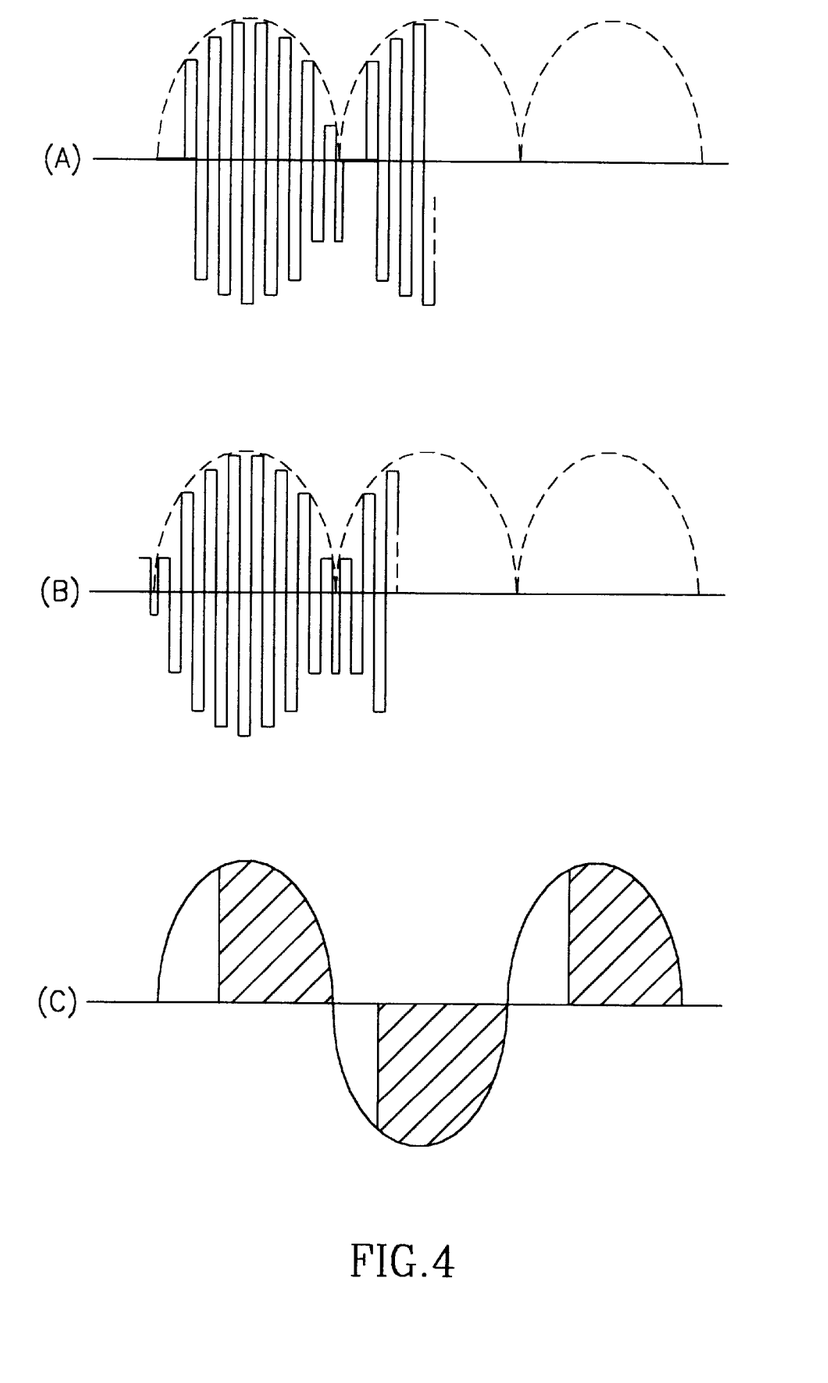
FIG. 4 shows sketches of voltage against time at various points in the circuit shown in FIG. I.

A fifth problem also relates to the use of electronic transformers of high power ratings. The inverter in an electronic transformer will generally stop oscillating when the input current crosses zero volts. Oscillations will only resume hundreds of microseconds later when the input voltage reaches a sufficient triggering threshold. As a result, the envelope of the output from an electronic transformer generally looks like FIG. 4 (a) having a break in each cycle of the rectified 50 Hz or 60 Hz envelope. This is associated with a harmonic distortion of the order of 20% which is unacceptable.

SUMMARY OF THE INVENTION

It is an object of the present invention to provide an electronic transformer in which at least some of the above-mentioned drawbacks are significantly reduced or eliminated.

According to the invention, there is provided an electronic transformer for lighting including an output transformer and a drive transformer, a protection mechanism being responsively coupled to a winding of the output transformer and to a winding of the drive transformer such that the voltage across each of the windings are approximately equal and opposite during normal operation but differ substantially during a short-circuit.

According to a preferred embodiment the electronic transformer contains a protection mechanism responsive to a temperature in the electronic transformer and acting to reduce power in the system when the temperature exceeds a certain preset temperature.

According to another embodiment there is included a capacitor for providing energy to trigger oscillations of an inverter and further including an auxiliary device for rapidly charging the capacitor when an input voltage of said electronic transformer changes suddenly from zero to a value substantially different to zero.

According to yet another embodiment there is included a capacitor for providing energy to maintain oscillations of an inverter while an input voltage of the electronic transformer crosses zero.

Use of an electronic transformer according to the invention in a power supply gives rises to one or more of the following advantages (i) the measurement of the current for the purpose of short-circuit or overload protection does not consume power (ii) the unit can regulate temperature by reducing power as temperatures rise without discontinuing operation (iii) the unit can work with a lead-edge dimmer attached to the input (iv) although radio frequency emissions are filtered, a dimmer may be used without causing noise (v) harmonic distortions are low even if the unit's power rating is of the order of 300 W.

BRIEF DESCRIPTION OF THE DRAWINGS

In order to understand the invention and see how the same may be carried out in practice, some preferred embodiments will now be described, by way of non-limiting example only, with reference to the accompanying drawings, in which.

DETAILED DESCRIPTION OF PREFERRED EMBODIMENTS

Figure 1A:
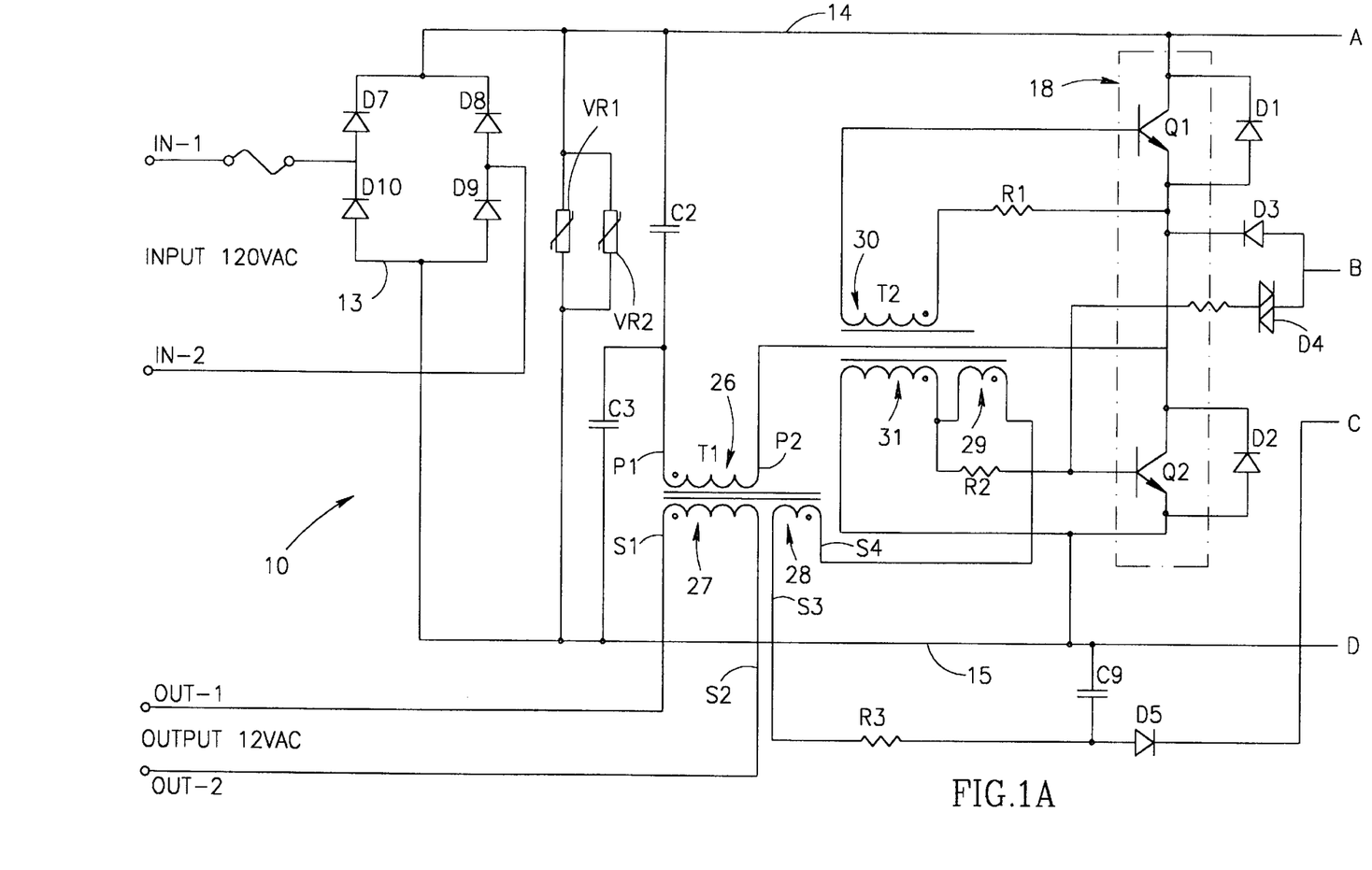
FIGS. 1a and 1b show an electrical schematic of an electronic transformer with a protection device according to the invention and exhibiting the advantages (i) to (iii) above.
Figure 1B:
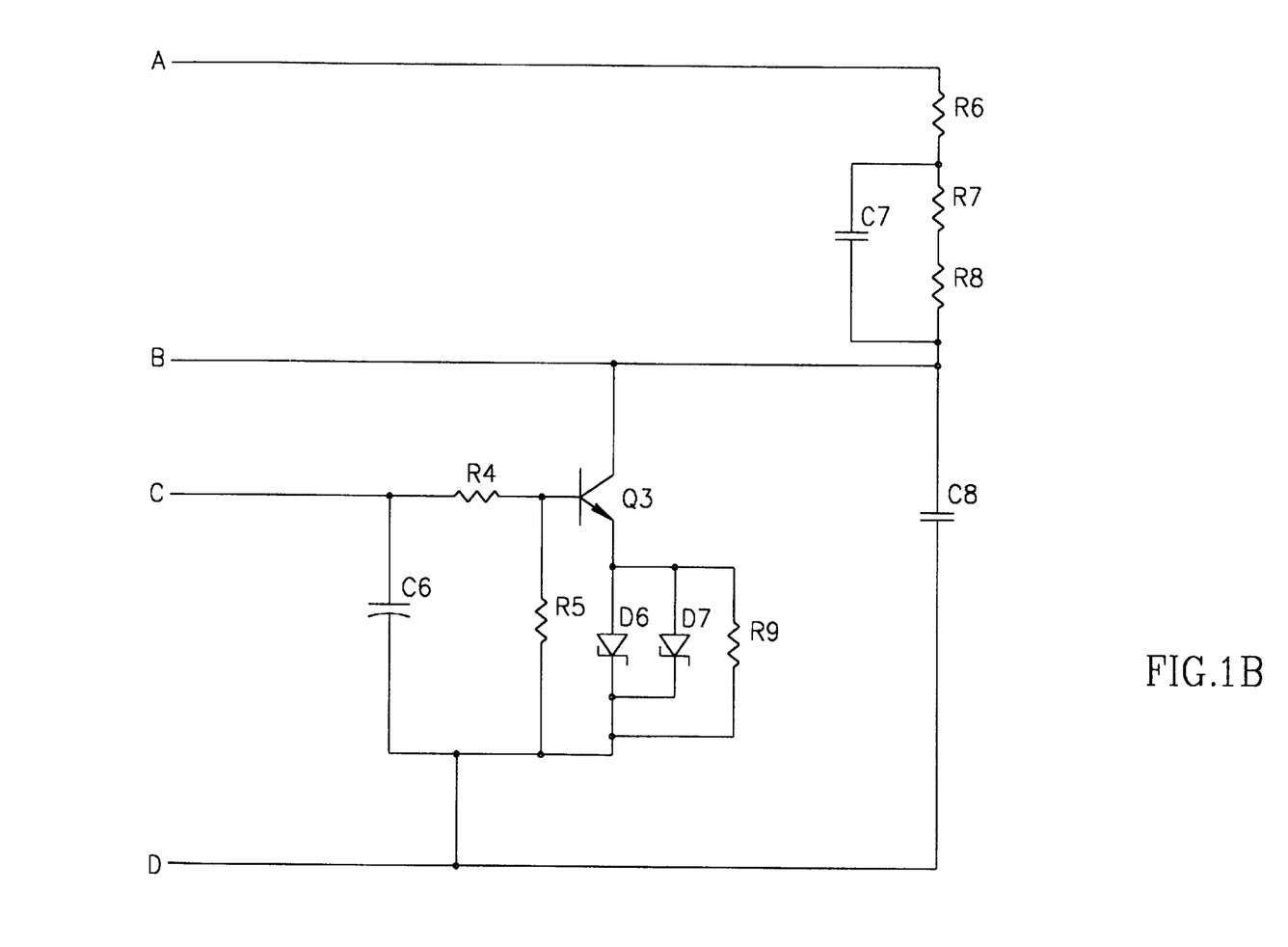

FIG. 1 shows schematically a 75 W electronic transformer according to the invention, depicted generally as 10 having a pair of 120 V/60 Hz input terminals IN-1 and IN-2 and a pair of 12V/38 kHz output terminals OUT-1 and OUT-2 suitable for halogen lighting. An input voltage applied across the input terminals IN-1 and IN-2 is rectified by discrete diodes D7 to D10 connected as a bridge rectifier 13. Alternatively, a conventional bridge rectifier component may be employed. At the output of the bridge rectifier 13 are respective positive and negative low voltage d.c. rails 14 and 15, connected across which varistors VR1 and VR2 provide protection against spikes on the input, which is then fed into an inverter comprising a half-bridge rectifier 18 and a chopper constituted by capacitors C2 and C3, and bipolar junction transistors Q1, Q2. The transistors are protected by respective diodes D1 and D2. A first transformer T1 has a primary winding 26 having taps P1 and P2 and is fed by the half bridge rectifier 18 and provides the 12V output across a first secondary winding 27, having taps S1 and S2. The transformer T1 has a second secondary winding 28, having taps S3 and S4.

A current transformer T2 has a first winding 29 coupled to the second secondary winding 28 of transformer T1 and serves as a drive transformer which drives the transistors Q1 and Q2 via windings 30 and 31, respectively. Triggering of the transistor Q2, after the zero crossing of the input, is provided by a diac D4 which is operated by energy stored in a capacitor C8. The capacitor C8 constitutes a primary capacitor, which is charged through a pair of resistors R7 and R8, as soon as the voltage across the capacitor C8 exceeds 32V. The tap S3 of the transformer T1 is coupled, via a resistor R3 and a rectifier diode D5 to the base of a bipolar junction transistor Q3 which is biased by means of a pair of resistors R4 and R5. The emitter of the transistor Q3 is connected to the negative supply rail 15 via a pair of Schottky diodes D6 and D7. A capacitor C6 is connected between the negative supply rail 15 and the junction of the base bias resistor R4 with the rectifier diode D5, and maintains the voltage the base bias voltage for a minimal time period.

In order to speed up the triggering of the inverter after the triggering of an external lead-edge SCR dimmer (not shown) on the input, an auxiliary charge circuit is provided for charging the capacitor C8 specifically when the input 120V a.c. voltage jumps from zero to a substantial value. The auxiliary charge circuit comprises a capacitor C7 (constituting an auxiliary capacitor) connected across the series connection of the resistors R7 and R8. In the event of such a jump, the input voltage is immediately divided across C8 and C7, which bypasses R7 and R8, and charges C8 very rapidly so that it may charge to 32V before the SCR in the external dimmer switches off for lack of hold-up current.

Measurement for the purpose of protection is provided by the pathway which goes through the winding 29 of the transformer T2 and the second secondary winding 28 of the transformer T1. During normal operation, the voltage applied across the winding 29 of the voltage transformer T2 and the voltage across the secondary winding 28 of the current transformer T1 are approximately equal and opposite and, in any event, the difference between them is less than the 1.4V needed to trigger the transistor Q3 across the diode D5. However in the event of a short-circuit on the output, the voltage across the secondary winding 28 of the voltage transformer T1 is eliminated while the voltage across the winding 29 of the current transformer T2 increases owing to the surge in current. This creates a voltage of several volts, which serves to charge the capacitor C6. If this situation persists for more than a few milliseconds, transistor Q3 is activated, thereby disabling the triggering diac D4 and stopping operation of the inverter circuit for an arbitrary time. In contrast to known current sensing means for electronic transformers, this device consumes virtually no power.

Should the unit reach a temperature of above approximately 85° C., the voltage needed to trigger transistor Q3 is reduced since $V_{BE}$ always decreases with temperature. The voltage across the diode D5 and the Schottky diodes D6 and D7 is thus reduced causing Q3 to conduct linearly, thereby acting to divide the voltage across R6–R8 and delay the triggering of D4. This behavior, like a dimmer, reduces the power of the electronic transformer. Thus the same transistor Q3 serves both to switch off power upon a short-circuit and also to regulate power as a function of temperature. Clearly, by selecting suitable values for the components, the triggering temperature can be varied.

Figure 2A:
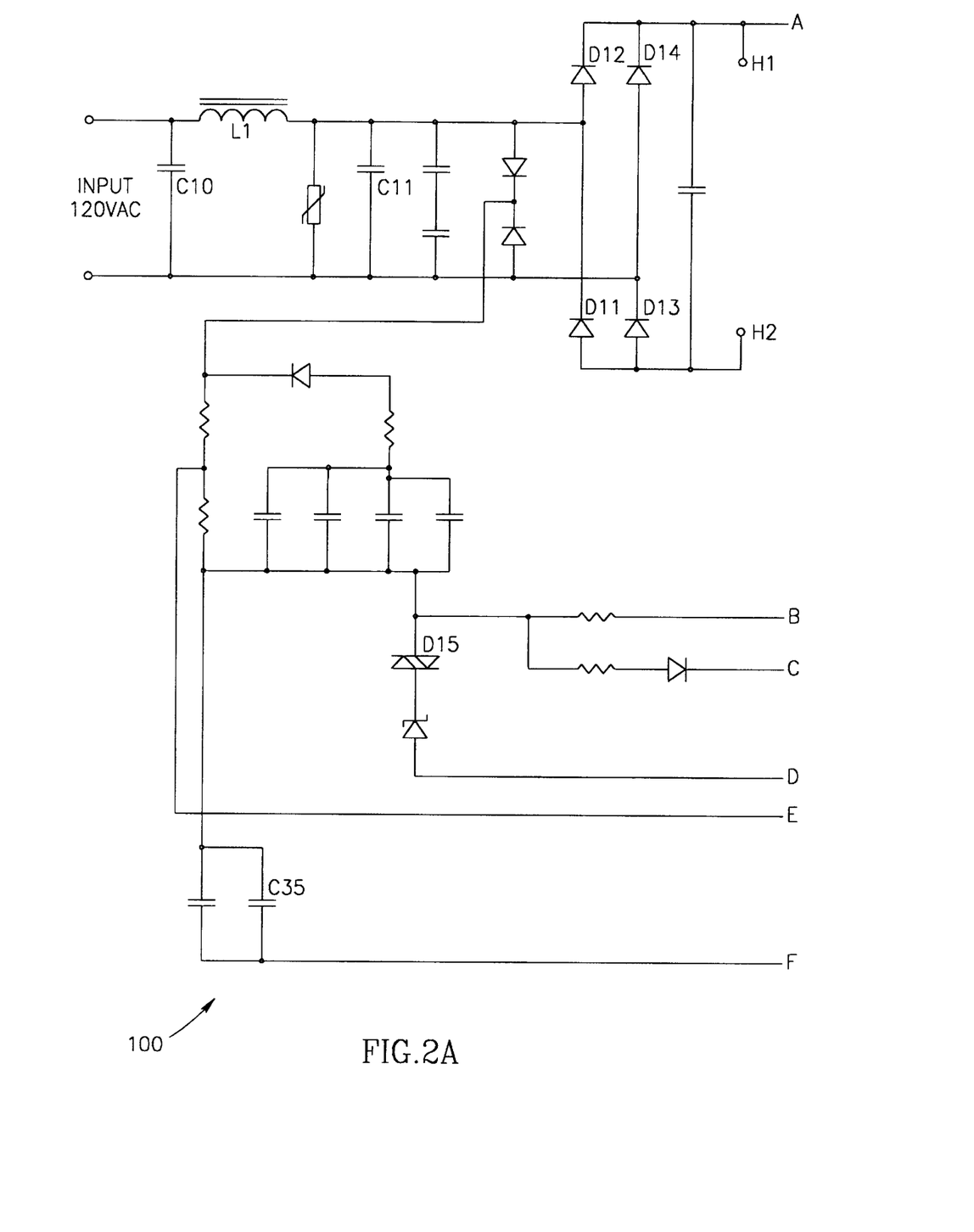
FIGS. 2a to 2c show an electrical schematic of an ordinary electronic transformer of a relatively high power rating.
Figure 2B:
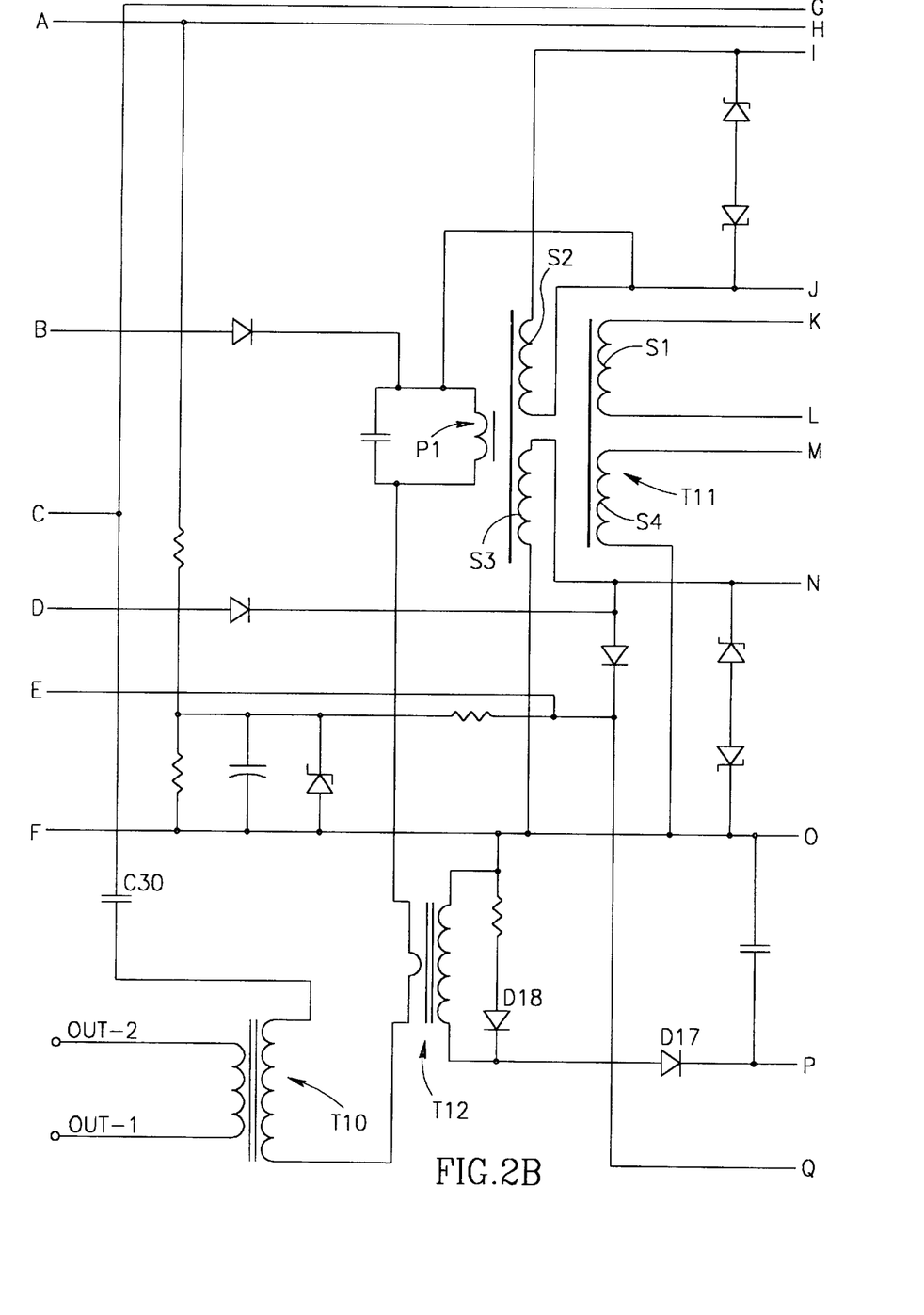
Figure 2C:
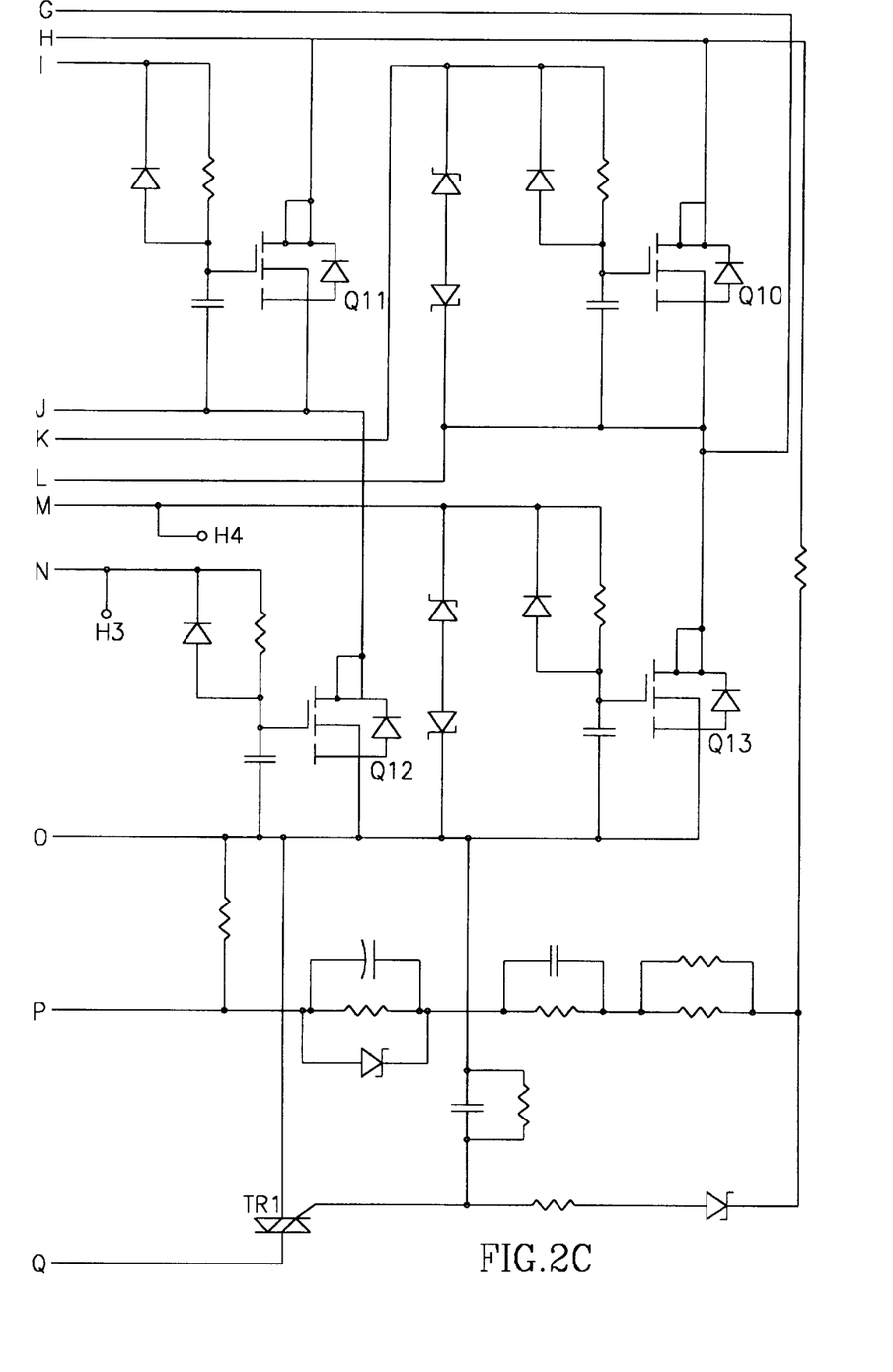

FIGS. 2a to 2c shows an electrical schematic of a second electronic transformer depicted generally as 100 rated for 300 W with 120V/60 Hz input and approximately 12V/30 kHz output. This circuit, shown in full, is based on known principles and will therefore be described only briefly. Thereafter various auxiliary circuits according to the invention, which may be added to it, will be described separately with particular reference to FIG. 3 of the drawings.

An input filter comprises capacitors C10 and C11 and an inductor L1 and blocks passage of the inverter's frequency, about 30 KHz, and harmonics, back to the utility network. Diodes D11 to D14 function as a conventional input rectifier. A full bridge inverter is constituted by power MOSFETs Q10 to Q13 and surrounding components, MOSFETs being more suited to the higher power rating of this transformer. An output transformer T10 is connected through a capacitor C30 to the bridge inverter and provides a 12V output. The system for triggering the start of oscillations is based on a triggering diode D15 which is switched using energy stored in a capacitor C35 and triggers first the MOSFET Q12. A drive transformer T11 has five windings, a primary P1 providing energy to the transformer itself and four secondary windings S1–S4 driving the MOSFETS Q10 to Q13, resepctively. A current transformer T12 in combination with surrounding components D17, D18, TR1 etc. constitute a short-circuit and overload protection. These components may be removed if short circuit protection is not required.

Figure 3:
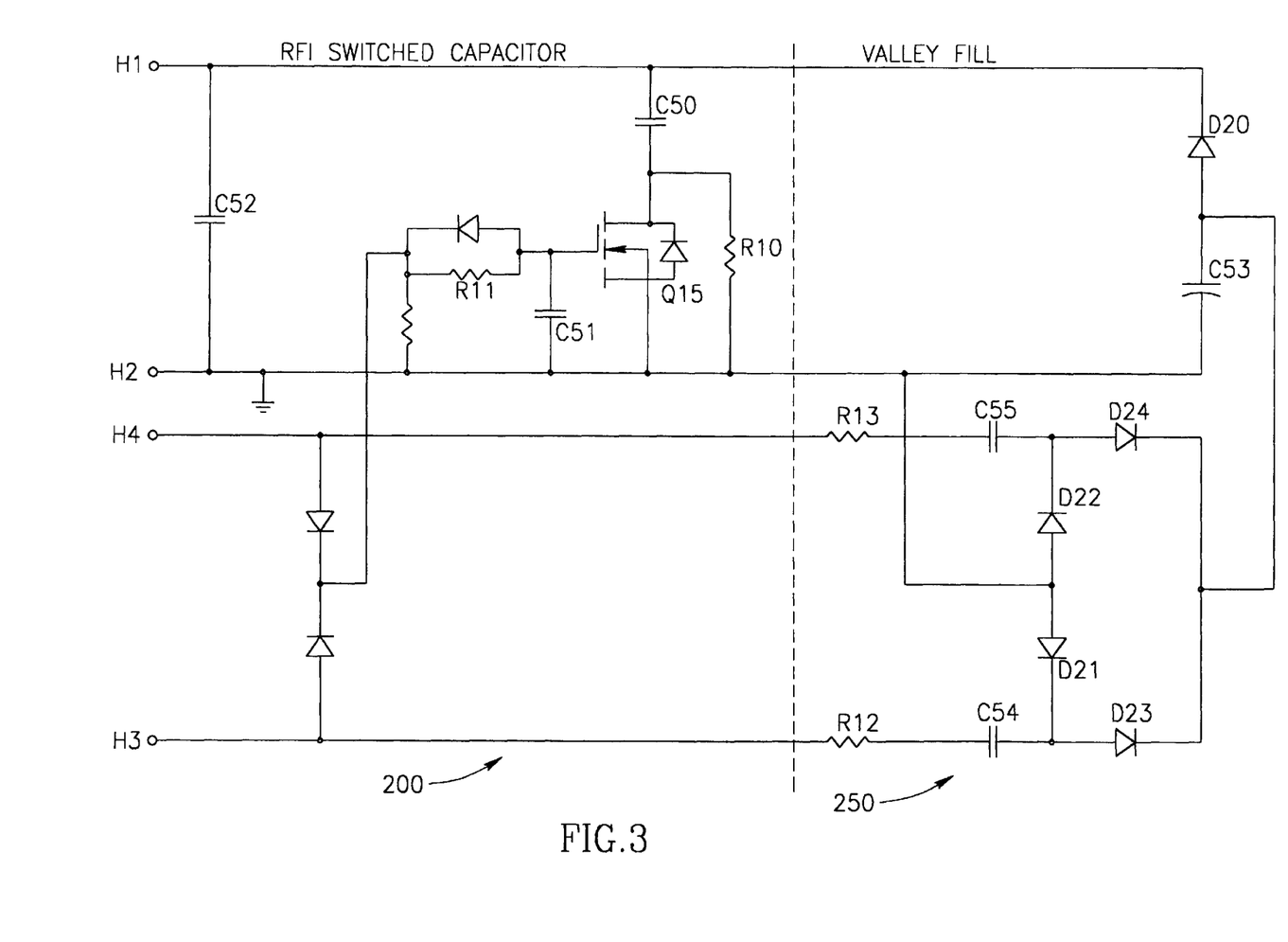
FIG. 3 is an electrical schematic of an auxiliary circuit according to the invention to be used together with the circuit in FIG. 2 in order to provide advantages (iv) and (v) above.

FIG. 3 shows two auxiliary circuits that may be attached to the above circuit via points H1–H4.

Thus an RFI switched capacitor circuit 200 includes a large value capacitor C50 to filter the 30 KHz frequency and its harmonics. This capacitor is placed immediately before the inverter for maximum effect. It has been found that only a large capacitor in this position, combined with other components (such as the input filter shown in FIG. 2a), can allow a 300 W electronic transformer to meet common RFI standards.

However, as explained above, when a dimmer is in use, the sudden current each time the dimmer triggers causes the capacitor C50 to vibrate with audile frequency 100 Hz or 120 Hz, possibly damaging some capacitors. This danger is avoided in the RFI switched capacitor circuit 200 shown in FIG. 3 by switching the capacitor C50 using a MOSFET Q15 which starts conducting a few hundred microseconds after the action of the dimmer, during which time the capacitor C50 is charged more gradually through R10, the delay being controlled by the time constant of C51 and R11. Bypassing the capacitor C50 during these few hundred microseconds causes only a small degradation of RFI but totally eliminates noise. In a preferred embodiment reduced to practice, C50 had a value of 470 nF, C51 had a value of 100 nF and R11 had a value of 3.3 KΩ.

A capacitor C52 is also connected across the output of the rectifier to give better filtration of smaller spikes. The voltage which drives Q15 is obtained through H3 and H4 from the two secondary windings S3 and S4 of the drive transformer T11, which are connected to the local ground. This voltage is rectified to give a source of 15V as soon the inverter starts working.

In order to reduce harmonic distortion from approximately 20% to 5% a second auxiliary circuit shown as 250 having a valley fill function is cascaded to the RFI switched capacitor circuit 200. The valley fill serves to store energy in a capacitor C53 during the 100 Hz or 120 Hz cycle so as to maintain the inverter oscillating even during the zero crossing of the input power thus eliminating the gap in oscillations which degrades harmonic distortion.

The capacitor C53 is charged to a steady value of about 30V and provides energy through a diode D20 to the connection points HI and H2 for maintaining oscillation of the oscillator during zero-crossing. As a result, the input to inverter is always above 30V and the oscillator works perpetually.

A voltage doubler comprising components C54, C55, D21, D22, D23 and D24 doubles the 15V output voltage from the drive transformer T11 from 15V to 30V thus charging capacitor C53 to 30 V Resistors R12 and R13 limit the current to avoid drawing too much energy.

FIGS. 4a and 4b show respectively, voltage waveforms at the output of the drive transformer T11 without and with the effect of the valley fill circuit. Thus, without valley fill, the output of the transformer T11 shown in FIG. 4a as a 30 KHz square wave, with 120 Hz envelope, has a gap after each zero of the envelope. With valley fill, the gap in the output of the transformer T11 shown in FIG. 4b is eliminated thus maintaining the oscillations continue even when the input voltage hits zero.

FIG. 4c shows the input voltage waveform to the electronic transformer when a dimmer is used to cut the input voltage for a proportion of the 50 Hz or 60 Hz half-cycle following the zero crossing.

What is claimed is:

1. An electronic transformer for lighting including a rectifier coupled to an inverter, an output transformer, and a drive transformer, and a protection mechanism being responsively coupled to a winding of the output transformer and to a winding of the drive transformer such that the voltage across each of the windings are approximately equal and opposite during normal operation but differ substantially during a short-circuit.

2. The electronic transformer according to claim 1, wherein said protection mechanism comprises:

a capacitor which is charged when the voltages across said windings differ in magnitude, and a transistor responsively coupled to the capacitor for switching whenever said capacitor is charged and thereby disabling the triggering mechanism of the inverter.

3. The electronic transformer according to claim 2, wherein said transistor conducts substantially linearly whenever a temperature of the electronic transformer exceeds a preset value, thereby delaying the triggering of the inverter and reducing the power in the electronic transformer.

4. The electronic transformer according to claim 2, including a triggering element responsively coupled to the transistor having a switching voltage which falls as temperature rises, whereby when the temperature exceeds a preset temperature the transistor conducts electricity thereby delaying the triggering of the triggering element.

5. An electronic transformer for a lighting system, said electronic transformer including a protection mechanism responsive to a temperature of the electronic transformer and acting to reduce a power output thereof when said temperature exceeds a predetermined temperature.

6. The electronic transformer according to claim 5, wherein said reduction in power is effected by delaying the triggering of the inverter following each zero-crossing of an input voltage.

7. The electronic transformer according to claim 5, wherein said reduction in power is effected by disabling the electronic transformer during some proportion of each half-cycle of an input voltage.

8. An electronic transformer for lighting, the transformer including a primary capacitor for providing energy to trigger oscillations of an inverter and further including an auxiliary device for rapidly charging said primary capacitor when an input voltage of said electronic transformer increases in magnitude suddenly from zero.

9. The electronic transformer according to claim 8, wherein said auxiliary device includes an auxiliary capacitor which together with the primary capacitor divides the voltage across the output of a diode bridge rectifier.

10. An electronic transformer for lighting, the transformer including a capacitor connected across the output of an input rectifier for filtering radio frequencies and further including a transistor and a delaying mechanism for connecting said capacitor a short time after an input voltage of the electronic transformer becomes non-zero.

11. The electronic transformer according to claim 10, wherein said transistor is driven by outputs of a drive transformer.

12. The electronic transformer according to claim 11, wherein said capacitor is charged through a drive transformer.

13. An electronic transformer for lighting, the transformer including a capacitor for providing energy to maintain oscillations of an inverter while an input voltage of the electronic transformer crosses zero.

* * * * *